Sept. 6, 1960  K. KARNATH ET AL  2,951,711
TRAILER COUPLING FOR TOWING VEHICLES FOR HAULING TRAILERS
WHOSE POLE IS PROVIDED WITH A TOWING EYE
Filed June 27, 1957  5 Sheets-Sheet 1

INVENTORS
K. Karnath, G. Karnath
K.-J. Karnath, D. Stahl
By Lowry & Rinehart
ATTYS.

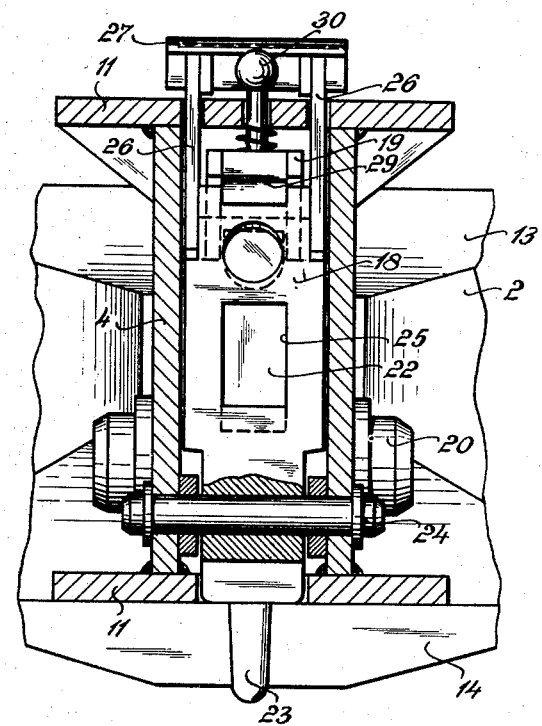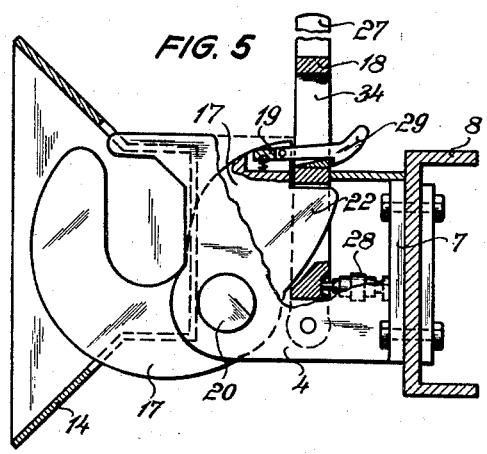

Sept. 6, 1960  K. KARNATH ET AL  2,951,711
TRAILER COUPLING FOR TOWING VEHICLES FOR HAULING TRAILERS
WHOSE POLE IS PROVIDED WITH A TOWING EYE
Filed June 27, 1957  5 Sheets-Sheet 3
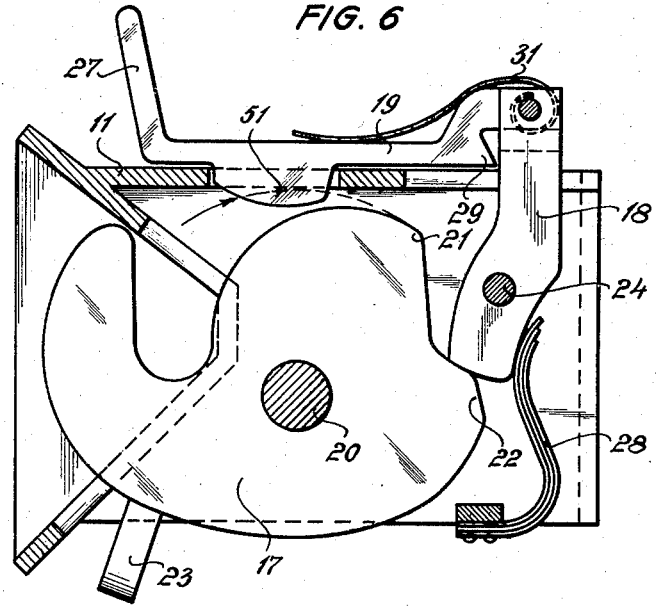
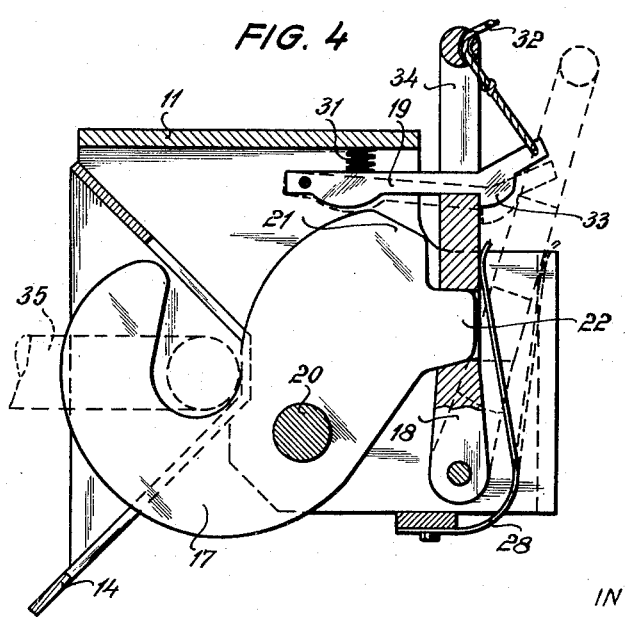
INVENTORS
K. Karnath, G. Karnath
K.-J. Karnath, D. Stahl
ATTY.

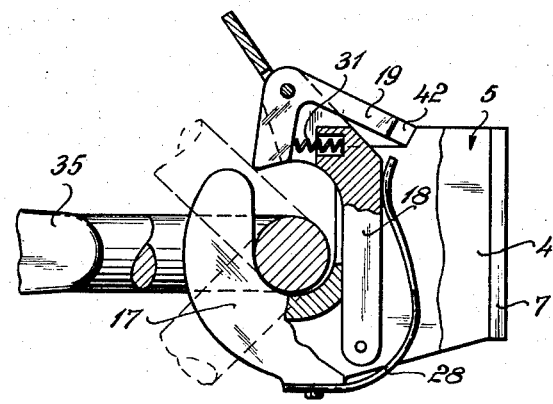
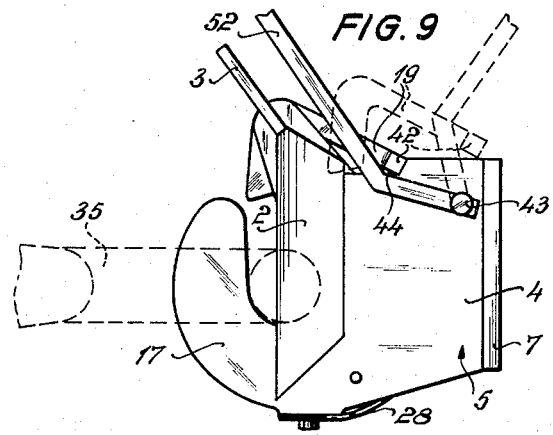
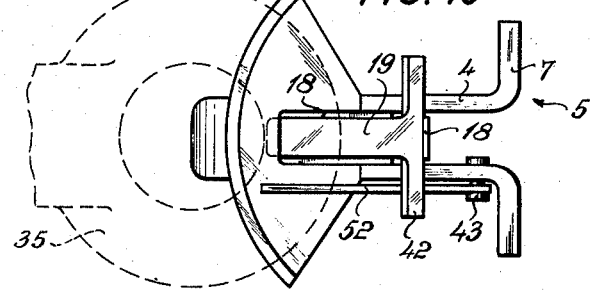

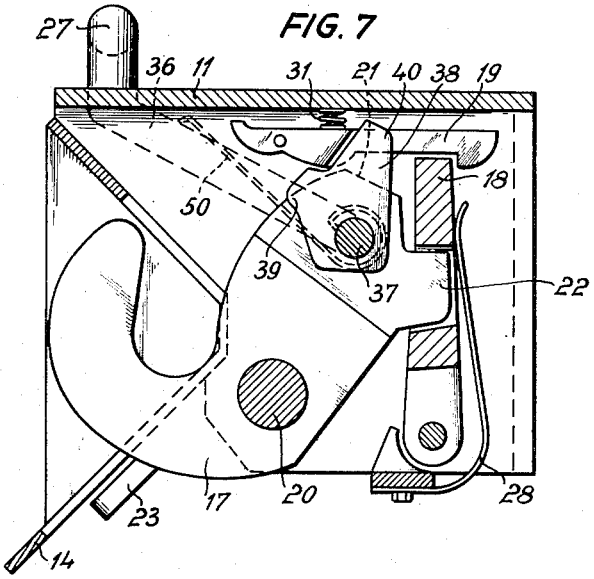
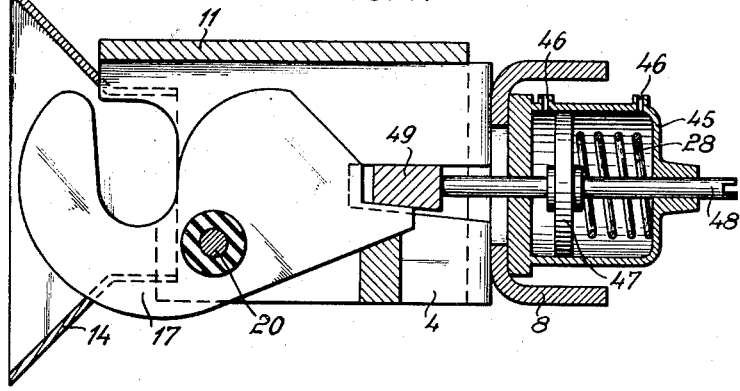
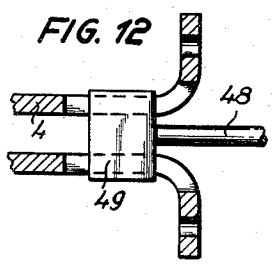 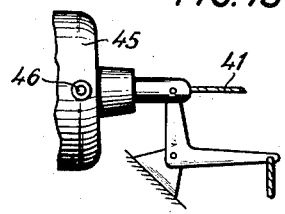
INVENTORS:
K. Karnath, G. Karnath,
Klaus-Jurgen Karnath & D. Stahl
By Lowry H. Rinehart
Atty.

United States Patent Office 2,951,711
Patented Sept. 6, 1960

2,951,711

TRAILER COUPLING FOR TOWING VEHICLES FOR HAULING TRAILERS WHOSE POLE IS PROVIDED WITH A TOWING EYE

Kurt Karnath, 22 Sonnenberger Strasse, Wiesbaden, Germany; Gunther Karnath, 92 Hertinger Strasse, Unna, Westphalia, Germany; Klaus-Jurgen Karnath, 22 Sonnenberger Strasse, Wiesbaden, Germany; and Dietrich Stahl, 15 Anhegger Strasse, Lindau, Bodensee, Germany Filed June 27, 1957, Ser. No. 668,444

Claims priority, application Germany June 28, 1956

3 Claims. (Cl. 280—508)

The invention relates to trailer couplings, and more specifically to a trailer coupling for towing vehicles for hauling trailers whose pole is provided with a towing eye, which enables automatic locking of the coupling hook and disengagement of the coupling under tension while travelling and when stationary, and which comprises a funnel-shaped guide means for guiding the towing eye and is fixed on a transverse member of the towing vehicle.

The known trailer couplings only partly fulfill these conditions and require complicated housings of undesirable constructional length and height in order to provide the necessary bearing and moving space for all movable parts of the coupling. In addition, these housings have internal projections for mounting and limiting the movement of the movable parts. As a consequence, the hitherto known housings for such trailer couplings were made from cast steel or malleable iron. Such housings are also open to the further objections of heavy weight, high machining cost and uncontrollable defects in the casting due to porous spots.

As compared therewith the invention has for its object to provide a trailer coupling which is free from the above mentioned objections and moreover also possesses further advantages, in particular a double positive locking of the coupling hook.

According to the invention, a trailer coupling for towing vehicles for hauling trailers comprises in combination with a towing eye on the hitch pole of a trailer, a coupling housing consisting of a U-shaped steel plate with side walls connected at its front end to at least one transverse member of the towing vehicle, a funnel-shaped guide means formed on the rear end of said coupling housing for introducing the towing eye of the trailer, a coupling hook arranged between the side walls of the coupling housing, and a double locking device with two successively operating positive locking means for the coupling hook, said locking device being also arranged between the side walls of the coupling housing and operated by the introduction of the towing eye into the housing to automatically lock said coupling hook and to uncouple this coupling when it is under tension when travelling and stationary.

The coupling hook forged from a steel plate or in a die may be shaped to cooperate with the towing eye during the coupling and uncoupling operations.

The coupling housing affords reliable protection against fouling and freezing up, saves special fixing flanges and, through the funnel-shaped guide means extending as and forming part of the housing, provides the necessary conditions for automatic coupling from different angles of engagement.

This constructional shape of the coupling housing constitutes a new type of trailer coupling which is not open to the aforementioned objections of the former coupling housings made from cast material and, moreover, through the homogeneousness of rolled material used, ensures a maximum of safety.

According to a special form of construction of the trailer coupling, the rearwardly extending side walls of the coupling housing merging into the side walls of the funnel-shaped guide means, form a constructional unit with bumper plates provided on the towing vehicle.

The relief of the transverse member of the towing vehicle is effected in this form of construction primarily in that the outer side walls of the buffer plates are fixed on two longitudinal girders of the towing vehicle. In addition, to further relieve the rear transverse member of the towing vehicle a second transverse member can be provided between the front ends of the outer side walls of the buffer plates for fixing the coupling housing, which second transverse member is also fixed to longitudinal girders of the towing vehicle. The front wall of the coupling housing is in this case bolted to the second transverse member so that strong sudden jolting stresses, caused by pull or pressure exerted by the trailer, can only act resiliently on the towing vehicle due to the elasticity of the material.

To limit the bending of the second transverse member, the fixing bolts of the coupling housing are also passed through the vehicle traverse and have abutments in the form of limiting nuts or the like which bear against the transverse member of the vehicle in the event of the second transverse member being subjected to excessive stress.

As a protection against damage and to damp shocks, cushions of elastic material, such as rubber or the like, can be arranged on the end wall of the buffer plates.

Several preferred embodiments of a trailer coupling according to the invention are illustrated diagrammatically and by way of example in the accompanying drawings, in which:

Fig. 3 is a section through Fig. 2 in a plane in front of the locking lever;

Fig. 4 is a side elevational view, partly in section, of another form of construction of the coupling with the coupling hook in closing position and double locking mechanism, and showing by dotted lines the relative positions of the locking lever and locking pawl in disengaged position when pressure is exerted on the coupling hook by the towing eye;

Fig. 5 is a side elevation, partly in section, of a further form of construction of the coupling;

Fig. 6 is a side elevation, partly in section, of still another form of construction of the coupling;

Fig. 7 is a side elevation, partly in section, of yet another form of construction of the coupling;

Fig. 8 is a side elevation, partly in section, of a form of construction of the coupling with rigid coupling hook;

Fig. 9 is a side elevation of the same form of construction as shown in Fig. 8, with separate operating lever and showing by dotted lines the operating lever and locking pawl in disengaged position;

Fig. 10 is a top plan view of the form of construction of the coupling illustrated in Fig. 9;

Fig. 11 is a side elevation, partly in section, of another form of construction of the coupling;

Fig. 12 shows the flange-like construction of the forward side walls in the form of construction illustrated in Fig. 11, and the guiding of the locking wedge in the side walls, and Fig. 13 shows in elevation the attachment of the pull rope to the piston rod.

Figure 1:
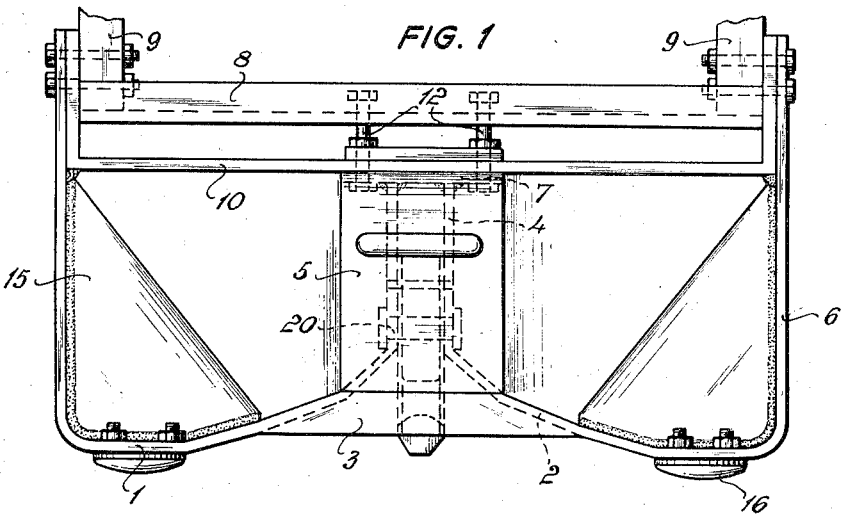
Fig. 1 is a top plan view of the connection of a trailer coupling with the buffer plates and a transverse member of a towing vehicle.
Figure 2:
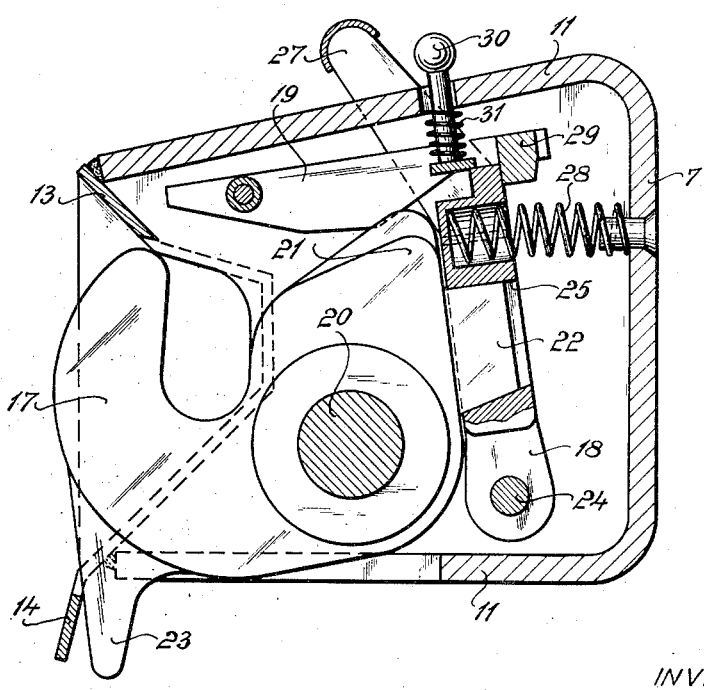
Fig. 2 is a side elevational view, partly in section, of one form of construction of the trailer coupling.

As can be seen from Figs. 1 and 2, buffer plates provided on a towing vehicle have side walls 6 and end walls 1 which latter are rigidly connected with vertical parallel side walls 4 of a coupling housing 5 through the intermediary of side walls 2 of a funnel-shaped guide means 3 which serves for guiding and introducing the towing eye of a trailer. The end walls 1 are bent forward and form the side walls 6 of the buffer plates. The coupling housing 5 has a front wall 7 that may be connected to a transverse member 8 of the towing vehicle. The side walls 6 of the buffer plates are bolted to longitudinal girders 9 of the towing vehicle.

When, as shown in Fig. 1, another coupling transverse member 10 is arranged behind the vehicle transverse member 8, the bent over ends of this transverse member 10 are bolted to the longitudinal girders 9 together with the side walls 6 of the buffer plates.

The coupling housing 5 consists of a U-shaped steel plate with arms 11 which form the upper and lower walls of said housing. The parallel side walls 4 of the coupling housing 5 are formed by the inner walls of the buffer plates and, as they form at the same time the side walls 2 of the funnel-shaped guide, they extend into the end walls 1 of the buffer plates.

The coupling housing is, in the form of construction illustrated in Fig. 1, bolted to the coupling traverse 10 by means of screw bolts which are extended so that they pass through the transverse member 8 of the towing vehicle. These screw bolts carry abutments 12, for example stop nuts, which bear against the vehicle transverse member 8 when the coupling traverse 10 is bent on being subjected to strong stressing, and prevent excessive bending.

The funnel-shaped guide means has an upper wall 13 and a lower wall 14 and the U-shaped bent steel plate of the coupling housing 5 is welded to the upper funnel wall 13 and the lower funnel wall 14. For the purpose of strengthening the buffer plates, reinforcement plates 15 are arranged between the end wall 1 and the side walls 6. The coupling housing 5 in conjunction with the funnel walls 2, 13, 14, the buffer plate walls 1, 6 and the coupling traverse 10, form a girder-like unit of great strength. All pressure or tension forces acting on this unit are, according to the invention, transmitted to the strong longitudinal girders 9 in the longitudinal direction of the towing vehicle.

Exchangeable cushions 16 of elastic material, such as rubber or the like, are arranged on the end walls 1 of the buffer plates.

As shown in Figs. 2 and 3, the individual parts of the coupling, such as coupling hook 17, locking lever 18 and locking pawl 19, are arranged in the coupling housing 5. The coupling hook 17 is pivoted on a bolt 20 and provided with two noses 21 and 22 as well as with a handle 23. The locking lever 18 is pivotally mounted on a retainer bolt 24 and has a recess 25 for the nose 22 on the coupling hook 17. The locking lever 18 is extended in upward direction by two arms 26 which pass through the upper housing wall 11. The arms 26 are interconnected by a handle 27. The locking lever 18 is held in its locking position by means of a pressure spring 28. The pivoted locking pawl 19 is provided with an abutment 29 for the locking lever 18 and carries a pin which projects through the housing wall 11 and carries an operating knob 30. A pressure spring 31 is arranged on the pin between the housing wall 11 and the locking pawl 19.

The coupling operation takes place automatically in that the thrust exerted by towing eye of the trailer swings the coupling hook 17 about its bolt 20, causing the nose 21 to lift the locking pawl 19 against the pressure exerted by the spring 31 so that the abutment 29 on the locking pawl 19 releases the locking lever 18. As the coupling hook 17 continues to swing, the nose 22 presses against the locking lever 18, which turns about the retainer bolt 24 against the action of the spring 28, in forward direction until the nose 22 of the coupling hook 17 enters the recess 25 in the locking lever 18, whereby the spring 28 swings the locking lever 18 towards the rear so that the nose 22 of the coupling hook 17 engages the recess 25 and thus locks the coupling hook 17 in its closed position. When the nose 21 has released the locking pawl 19, the spring 31 presses the locking pawl 19 back into its initial position so that the abutment 29 of the locking pawl 19 bears against the locking lever 18, thereby effecting a double locking of the coupling (Fig. 2).

For the purpose of uncoupling, the locking pawl is lifted by means of the operating knob 30, using two fingers, against the pressure of the spring 31, and thereupon the handle 27 is shifted forward by the ball of the thumb, with the result that the locking lever 18 releases the nose 22 and the coupling hook 17 swings down about its bolt 20 and frees the towing eye of the trailer (Fig. 2).

If it is desired to bring the coupling hook 17 into its closed position by hand, which may be necessary when inserting chains or wire ropes, the coupling hook 17 is gripped by the handle 23 and swung about the bolt 20, whereupon the process above described takes place until the closed position is reached.

In the form of construction of the coupling illustrated in Figs. 2, 4 and 6, the sharply curved shape of the front part of the movable coupling hook 17 above the coupling mouth enables the coupling hook 17 to turn easily when a towing eye 35 is introduced at any angle. The locking lever 18, in the forms of construction illustrated in Figs. 2, 4, 5 and 7, is constructed as a one-armed straight lever and, according to Figs. 2, 4 and 5, extends beyond the upper wall 11 of the coupling housing 5. The free end of the locking lever 18 is constructed as a handle in Figs. 2, 4 and 5. In the construction shown in Fig. 4 a pull rope 32 passes through an aperture in this handle and its lower end is attached to the free end of the locking pawl 19. In the case of remote release of the coupling, the rope 32, on being pulled, shifts the locking pawl 19 first away from the locking lever 18 and thus out of its locking position and then, on the rope 32 being pulled further, the locking lever 18 is swung forward thereby liberating the coupling hook 17.

If the coupling according to Fig. 4 is to be kept in open position, which is necessary when the towing eye of the trailer presses against the coupling hook 17 when the vehicle is stationary, the locking lever 18 is swung forward until a step 33 of the locking pawl 19 bears against the rear side wall of the locking lever 18 as shown in dotted lines in Fig. 4.

In the form of construction illustrated in Fig. 5, the locking pawl 19 is linked to the coupling hook 17 and, in locking position, engages in a second upper recess 34 in the locking lever 18.

In the form of construction shown in Fig. 6, the locking lever 18 is a two-armed lever and has its fulcrum in the housing on the retainer bolt 24. The pressure spring 28 which preferably is a multiple blade spring arranged in the housing, exerts a constant pressure on the lower arm of the two-armed locking lever 18. The upper arm of the lever projects upwards from the housing and is here articulated to the locking pawl 19 acted upon by the pressure spring 31. The locking pawl 19 extends substantially parallel to the upper edge of the coupling housing and is bent over at its free end to form the operating handle 27. The abutment 29 on the locking pawl 19 cooperating with an aperture in the upper housing plate enables the locking lever 18 to be fixed in open position. A curved portion 51 of the locking pawl 19 projects into the aperture in the upper housing plate when the coupling is in closed position and is raised out of this position by the nose 21 on the coupling hook 17 for the purpose of coupling.

In this case the uncoupling is effected by raising the handle 27 and pulling it back in the direction towards the trailer. Thus the curved portion 51 is first lifted out of the aperture in the housing and the locking lever 18 is then pulled back by the locking pawl 19. The nose 22 of the coupling hook 17 thereby looses its hold on the lower arm of the locking lever 18 so that the coupling hook 17 is caused by its specific gravity or the pull exerted by the trailer through the towing eye, to turn into its open position and release the trailer.

In the form of construction illustrated in Fig. 7, which comes particularly into question in the case of heavily loaded trailers, which must be released sometimes when the trailer is exerting a considerable pull, the locking lever 18 is of shorter length so that it no longer projects from the housing.

For the purpose of uncoupling a special operating lever 36 is arranged on the outer side of one of the parallel side walls of the housing on a knockout spindle 37 extending into the housing. This presents the advantage that the housing is completely closed, even at the top. The knockout spindle 37 carries inside the housing a pressure plate 38 provided with two noses 39 and 40. A spring 50 holds the operating lever 36 in normal position.

Coupling up is effected in the same way as that above described by the turning of the coupling hook 17 with its noses 21 and 22. When the operating lever 36 is actuated for the purpose of uncoupling, this is moved forward. The nose 39 of the pressure plate 38 then acts on the locking pawl 19 and the nose 40 subsequently acts on the locking lever 18 so that both are successively pressed out of their locking positions.

The favorable leverage ratio between the pressure plate 38 and the operation lever 36 with the handle 27 enables any considerable pressure exerted by the coupling hook 17 on the locking lever 18 to be easily overcome.

In the form of construction according to Fig. 8 a rigid or stationary coupling hook 17 is provided. The one-armed locking lever 18 is constructed in its upper part also as a mouth closing member and carries the locking pawl 19 constructed as an elbow lever which is maintained in locking position by the pressure spring 31 arranged on the head of the locking lever 18. A handle 42 is provided at the front end of the elbow lever 19 for simultaneously operating both locking mechanisms during the uncoupling operation.

To simplify the uncoupling operation and also to enable it to be carried out by untrained persons, it is possible in this form of construction, as illustrated in Figs. 9 and 10, to link an oscillatable bent operating lever 52 to an axle 43 arranged at the top of the housing outside the side wall thereof, the apex 44 of this lever being located below the abutment portion 42 of the elbow lever 19 hitherto constructed as a handle. The bent free end of the operating lever 52 projects beyond the funnel-shaped guide means 3 which limits the swinging movement of the operating lever 52 towards the rear.

For the purpose of uncoupling, the operating lever 52 is brought into the position shown in dotted lines in Fig. 9. The abutment portion 42 of the elbow lever 19 then disengages from the housing 5. The abutment portion 42 thereupon slides along the operating lever 52 as the movement continues and draws the locking lever 18 forward, thereby clearing the coupling mouth. When coupling up, the towing eye 35 strikes against the rear part of the elbow lever 19, causing this and the locking lever 18 to swing forward and clear the coupling mouth.

In the form of construction illustrated in Figs. 11, 12 and 13 the side walls 4 of the coupling housing 5 bent in U-shape in vertical direction, are also bent forward at right-angles for the purpose of fixing to the transverse member 8 of the vehicle. The bolt 20 of the coupling hook 17 is preferably elastically mounted against pull and pressure. On the opposite side of the transverse member 8 a pressure cylinder 45 is arranged with inlets 46 for the admission of pressure medium. The pressure cylinder 45 is equipped with a pressure piston 47 and a pressure spring 28. A piston rod 48 extends in both directions from the pressure piston 47 and carries at its rear end a locking wedge 49 for the coupling hook 17. The locking wedge 49 is guided in slots in the side walls 4. In this case the double locking of the coupling hook 17 is effected by the pressure exerted by the spring 28 and by the pressure medium.

The remote disengagement of the coupling is effected either by the pressure medium, which after actuation of a valve on the driver's seat, loads the pressure piston 47, or by hand by pulling a rope 41 or link system attached to the front end of the piston rod 48.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

We claim:

1. A trailer coupling for towing vehicles for hauling trailers, comprising in combination with a towing eye on the hitch pole of a trailer, a coupling housing consisting of a U-shaped steel plate the web of which is connected to at least one transverse member of the towing vehicle, a funnel-shaped guide means formed on the rear end of said coupling housing for introducing the towing eye of the trailer, a coupling hook arranged between the side walls of the coupling housing, and a resiliently biased double locking means comprising two successively operating positive locking elements for the coupling hook, said locking means also being arranged between the side walls of the coupling housing and operated by the introduction of the towing eye into the housing to automatically lock said coupling hook and to uncouple this coupling hook when it is under tension and when travelling and stationary and said locking elements being provided with means projecting outside of said housing and above the coupling hook which can be engaged by the operator for moving said locking elements from a locking to an unlocking position, the coupling hook being oscillatably mounted on a bolt and the double locking means for the coupling hook located between the side walls of the coupling housing comprises an oscillatable one-armed spring-loaded and vertically mounted locking lever provided with a recess cooperating with a nose on the oscillatable coupling hook, said lever being operatively connected to a horizontally mounted, spring-loaded locking pawl.

2. A trailer coupling as set forth in claim 2, wherein the front portion of the movable coupling hook is curved above the mouth of the coupling and has two noses one of which comes into cooperative connection with a convex underside of the locking pawl and the other with the locking lever during the closing movement of the coupling hook.

3. A trailer coupling for towing vehicles for hauling trailers, comprising in combination with a towing eye on the hitch pole of a trailer, a coupling housing consisting of a U-shaped steel plate the web of which is connected to at least one transverse member of the towing vehicle, a funnel-shaped guide means formed on the rear end of said coupling housing for introducing the towing eye of the trailer, a coupling hook arranged between the side walls of the coupling housing, and resiliently biased double locking means provided with two successively operating positive locking elements for the coupling hook, said locking means also being arranged between the side walls of the coupling housing and operated by the introduction of the towing eye into the housing to automatically lock said coupling hook and to uncouple this coupling hook when it is under tension and traveling and stationary, said coupling hook also being oscillatably mounted on a bolt and the double locking means for the said hook being located between the side walls of the coupling housing, the locking elements of said double locking means comprising an oscillatable one-armed spring loaded and vertically mounted locking lever provided with a recess cooperating with a nose on the oscillatable coupling hook and a horizontally mounted spring-loaded locking pawl operatively connected to the said lever, and said lever having two arms extending upwardly through slots in the upper wall of the coupling housing and interconnected by a handle, and said pawl having a pin passing upwards through an aperture in the upper wall of the coupling housing, said pin being provided with an operating knob within reach from the handle.

References Cited in the file of this patent

UNITED STATES PATENTS

| | | |
|---|---|---|
| 2,129,745 | Scammell et al. | Sept. 13, 1938 |
| 2,217,148 | Weiss | Oct. 8, 1940 |
| 2,547,313 | Gosser | Apr. 3, 1951 |
| 2,559,962 | Hudson | July 10, 1951 |
| 2,569,086 | Zenk | Sept. 25, 1951 |